Patented Dec. 6, 1932

1,889,863

UNITED STATES PATENT OFFICE

EMIL LÜSCHER, OF BASEL, SWITZERLAND, ASSIGNOR TO LONZA ELEKTRIZITATS-WERKE UND CHEMISCHE FABRIKEN AKTIENGESELLSCHAFT, OF BASEL, SWITZERLAND, A CORPORATION OF SWITZERLAND

PREPARATION OF DOUBLE SALTS OF CALCIUM NITRATE

No Drawing. Application filed March 1, 1932, Serial No. 596,155, and in Switzerland March 4, 1931.

In my United States Patent No. 1,776,694, dated Sept. 23, 1930, there is described a process for the preparation of double salts of calcium nitrate consisting in adding a salt of a monovalent cation preferably ammonium nitrate or potassium nitrate, to a hot solution of calcium nitrate containing at least 65% of anhydrous calcium nitrate, in such amount that the reaction product of calcium nitrate and added nitrate contains about 5 moles of calcium nitrate per 1 mole of ammonium or potassium nitrate. As suitable addition salts there can also be employed such salts as are capable of forming nitrates with calcium nitrate as e. g. potassium chloride.

Thereby there are obtained double salts of the formula $5Ca(NO_3)_2NH_4NO_310H_2O$ and $5Ca(NO_3)_2KNO_310H_2O$.

According to the present invention these double salts are prepared by employing the added nitrate in considerable excess over the calcium nitrate. Advantageously to 5 moles of calcium nitrate 1.5-2.5 moles of potassium or ammonium nitrate are employed.

The process is carried out in such a manner that into a hot calcium nitrate solution which contains about 70-82% of calcium nitrate, there is introduced the ammonium or potassium nitrate in solid form, and the solution is slowly allowed to cool while stirring. Thereby there are produced beautiful well formed crystals, which may be separated from the still hot mother liquor by centrifuging or filtration. The crystallization can be favourably influenced by known processes such as seeding.

The mother liquors which contain the excess of ammonium or potassium nitrate used, may be returned to the process at the corresponding concentration.

The use of ammonium nitrate in considerable excess over the amount necessary for formation of the double salt has the advantage that the crystallization process is favourably influenced thereby. By the introduction of ammonium nitrate into the hot calcium nitrate solution, there are obtained less viscous melts, from which larger and better formed crystals are obtained, which are specially suitable for fertilizing purposes.

Also the crystals formed from the less viscous melts, can more easily be separated by centrifuging or by filtration.

The addition of larger amounts of ammonium or potassium nitrates has been found to be particularly advantageous when relatively highly concentrated calcium nitrate solutions are worked up.

It has been further found that for the carrying out of the process, the presence of anhydrous salt, in particular of large amounts of anhydrous salt, is a disadvantage.

Anhydrous calcium nitrate is not capable of double salt formation. Moreover it impedes the crystallization process and the good formation of the crystals. Calcium nitrate solutions of 83-85% and over in calcium nitrate contain already considerable amounts of anhydrous calcium nitrate. They are therefore not suitable for the successful carrying out of the process.

Calcium nitrate solutions of content 80-82% calcium nitrate in fact, already also contain anhydrous salt. If however there is added ammonium or potassium nitrate in excess, the anhydrous salt goes again into solution so that clear solutions, suitable for the crystallization of the double salt can be obtained. On the ground of the above observations it is recommended that the calcium nitrate solutions to be worked up should not exceed 82% in concentration.

The process can be carried out with exceptional success with the use of calcium nitrate solutions of 70-80%. For the practical carrying out of the process there are used solutions in general of 75-80%, preferably of 75-78%. The amount of ammonium nitrate added is in general, more than 12% preferably 15–25% calculated on the $Ca(NO_3)_2$ present. In certain cases it may even be more.

Calculated in molecular ratios 12% signifies about 1.2 moles $NH_4NO_3$ (to 5 moles $Ca(NO_3)_2$) and 15–25% about 1.5 to 2.5 moles $NH_4NO_3$ (per 5 moles $Ca(NO_3)_2$).

*Example*

To 2350 g. of an 80% calcium nitrate solution were added 20% (=470 g.) ammonium nitrate. By slow cooling of the hot solution the crystallization sets in. The salt is centrifuged off after 4 hours, at 67° C. The yield was 1000 g. of beautifully crystallized double salt. The crystals can be subjected to a partial or complete dehydration by treating the same in a heated drum.

I declare that what I claim is:—

1. The process of making double salts of the formula $$5Ca(NO_3)_2MeNO_310H_2O$$

which comprises adding a nitrate of a monovalent cation to a hot strong solution of calcium nitrate the said added nitrate being in considerable excess over the amount required for the double salt formation, crystallizing by slow cooling, separating the crystals from the hot mother liquor.

2. The process of preparing a double salt of the composition $$5Ca(NO_3)_2NH_4NO_310H_2O$$

which consists in adding ammonium nitrate in considerable excess over the amount required for double salt formation, to a hot solution containing 70%–82% of calcium nitrate, allowing to crystallize by slow cooling, and separating the double salt formed from the still hot mother liquor.

3. The process of preparing a double salt of the composition $$5Ca(NO_3)_2NH_4NO_310H_2O$$

which consists in adding ammonium nitrate in considerable excess over the amount required for double salt formation, to a hot solution containing 75–80% of calcium nitrate, allowing to crystallize by slow cooling, and separating the double salt formed from the still hot mother liquor.

4. The process of preparing a double salt of the composition $$5Ca(NO_3)_2NH_4NO_310H_2O$$

which consists in adding 1.5–2.5 moles of ammonium nitrate per 5 moles of calcium nitrate, to a hot solution of 70–82% of calcium nitrate, allowing to crystallize by slow cooling, and separating the double salt formed from the still hot mother liquor.

5. The process of preparing a double salt of the composition $$5Ca(NO)_2NH_4NO_310H_2O$$

which consists in adding 1.5–2.5 moles of ammonium nitrate per 5 moles of calcium nitrate to a hot solution containing 75–80% of calcium nitrate, allowing to crystallize by slow cooling, and separating the double salt formed from the still hot mother liquor.

6. The process of preparing a double salt of the composition $$5Ca(NO_3)_2NH_4NO_310H_2O$$

which consists in adding ammonium nitrate in considerable excess over the amount required for double salt formation, to a hot solution containing 75–78% of calcium nitrate, allowing to crystallize by slow cooling, and separating the double salt formed from the still hot mother liquor.

7. The process of preparing a double salt of the composition $$5Ca(NO)_2KNO_310H_2O$$

which consists in adding potassium nitrate in excess over the amount required for double salt formation, to a hot solution containing 70–80% of calcium nitrate, allowing to crystallize by slow cooling, and separating the double salt formed from the still hot mother liquor.

In witness whereof, I have hereunto signed my name this 18th day of February, 1932.

EMIL LÜSCHER.